Dec. 30, 1952  W. L. HATCH  2,623,270
HACKSAW LIFT
Filed Nov. 7, 1949  3 Sheets-Sheet 3
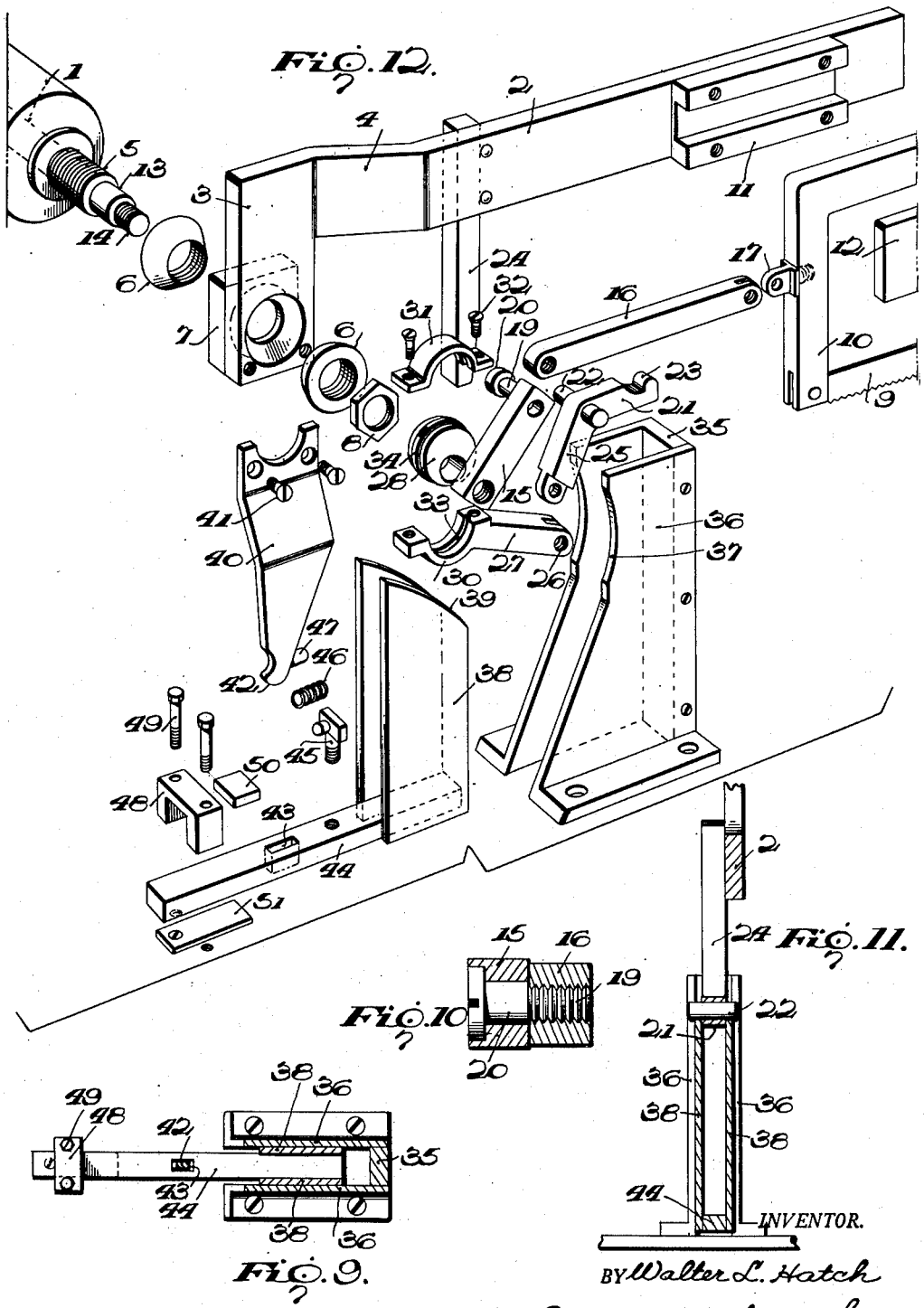
INVENTOR.
BY Walter L. Hatch
Cameron Kerkam + Sutton
ATTORNEYS Patented Dec. 30, 1952

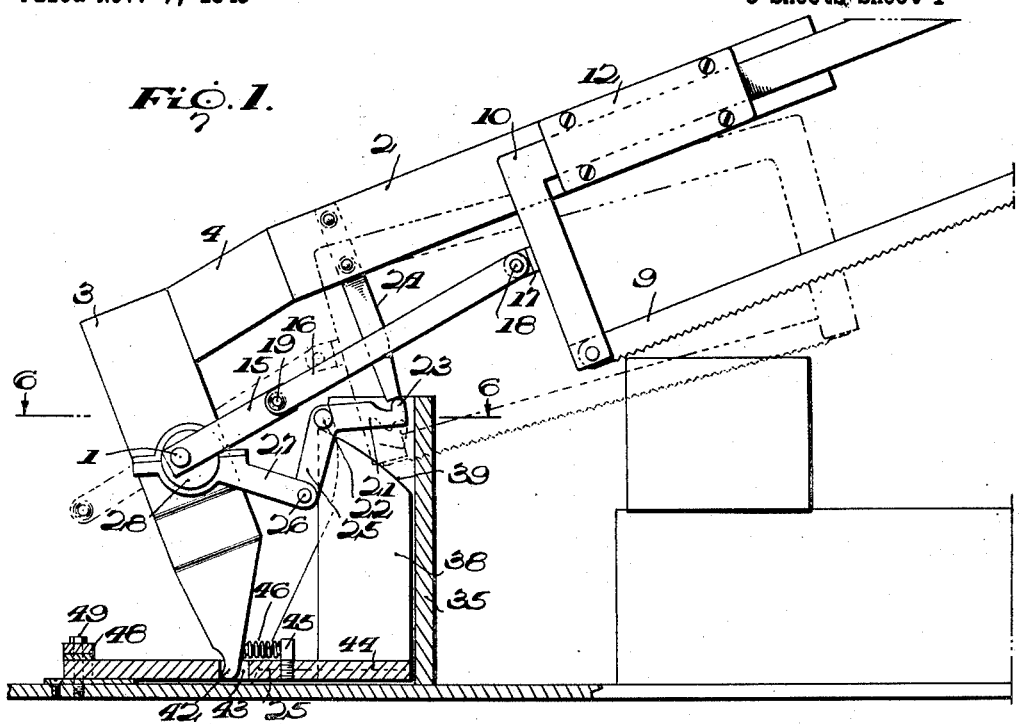
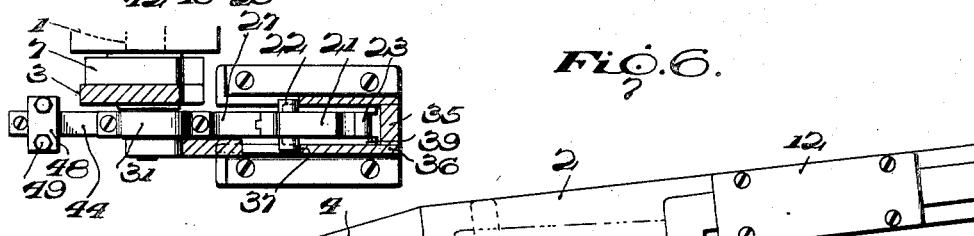
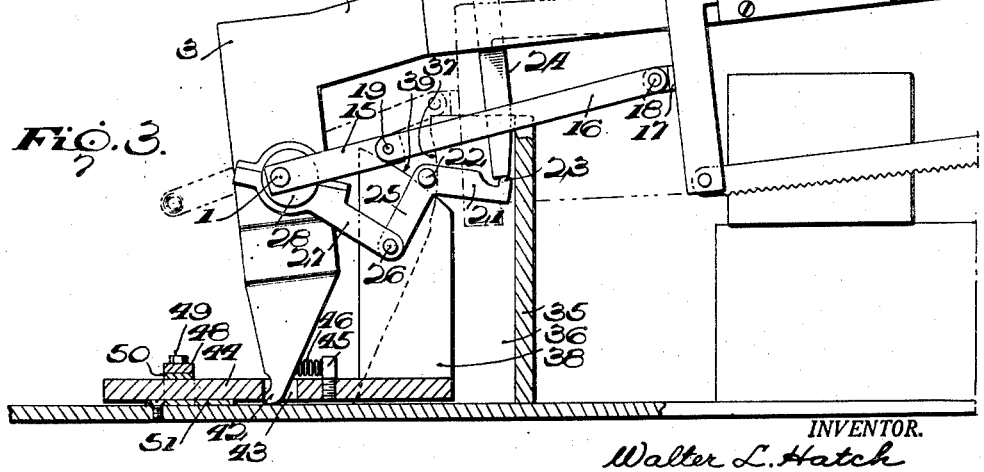

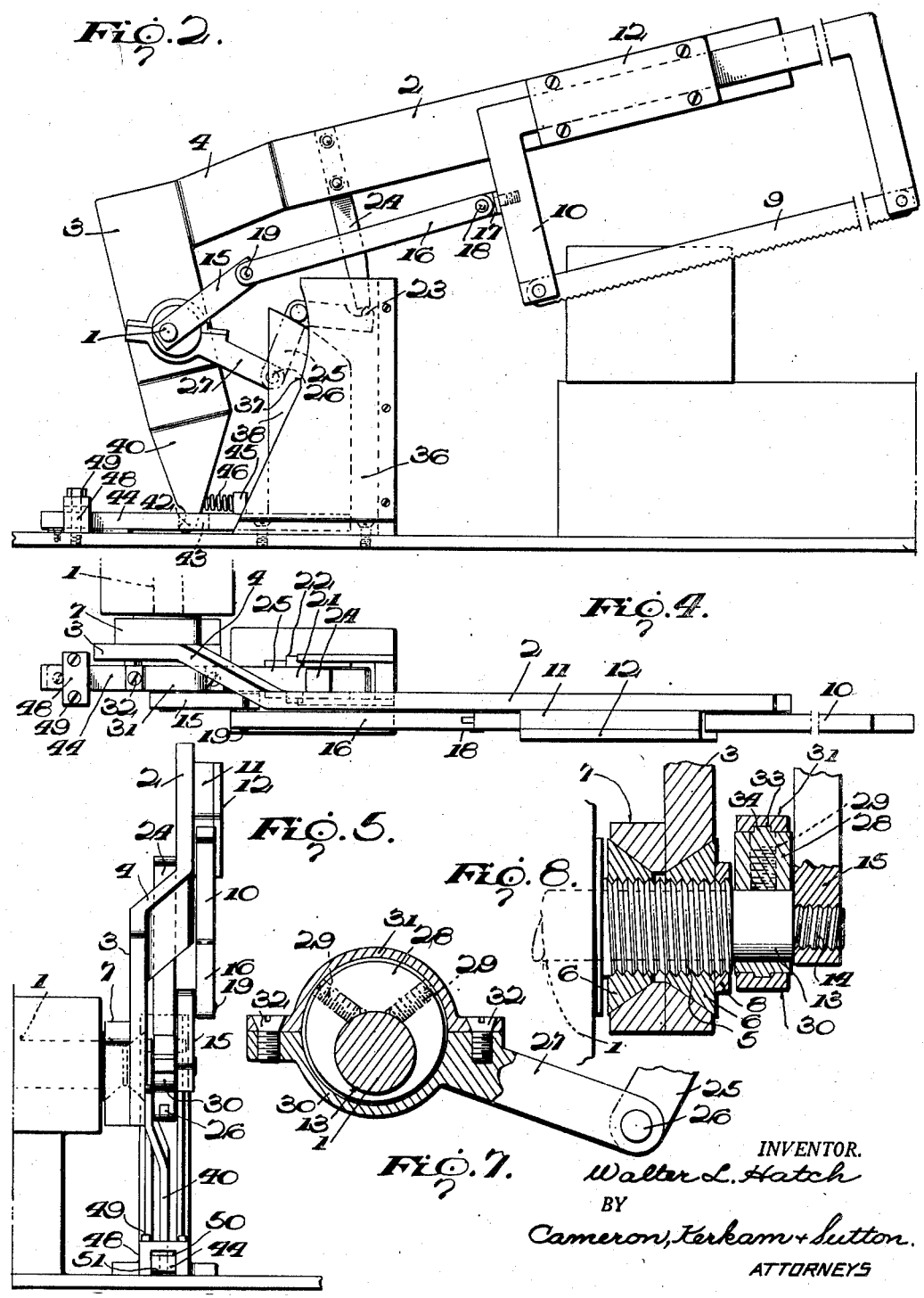

2,623,270

UNITED STATES PATENT OFFICE 2,623,270

HACKSAW LIFT

Walter L. Hatch, Aumsville, Oreg.

Application November 7, 1949, Serial No. 126,038

4 Claims. (Cl. 29—73)

This invention relates to hacksaw lifts, i. e., to apparatus which automatically pulls a hacksaw through the work on its cutting stroke and lifts, returns and lowers the saw for its next cutting stroke as the cut sinks gradually through the work.

One object of the invention is to provide a novel apparatus of the above type which is simple and inexpensive, yet efficient and fast in operation.

Another object is to eliminate the use of relatively delicate parts such as ratchets, gears and clutches and to provide a novel apparatus which is sturdy in construction and has a minimum of moving parts which are not liable to wear or to get out of adjustment.

A further object is to eliminate bump or shock on both the lift and the let-down of the saw.

A still further object is to eliminate the use of forgings or castings and to provide an apparatus that can be built out of stock materials such as bar, flat and angle steel, pipe and plate.

Other objects of the invention will appear more fully hereinafter as the description proceeds.

One embodiment of the invention has been illustrated in the accompanying drawings, but it is to be expressly understood that said drawings are for purposes of illustration only and are not to be construed as a definition of the limits of the invention, reference being had to the appended claims for this purpose.

In the drawings, Figs. 1, 2 and 3 are side views of the apparatus illustrating different and successive states in its operation;

Fig. 4 is a plan view of the apparatus;

Fig. 5 is an end view of the apparatus;

Fig. 6 is a section on the line 6—6 of Fig. 1;

Figs. 7 and 8 are details showing the mounting of parts of the apparatus on its drive shaft;

Figs. 9, 10 and 11 are sectional details of parts of the apparatus; and

Fig. 12 is an exploded perspective view illustrating the relative arrangement of the parts.

Referring to the drawings, the apparatus is driven by a shaft 1 that can be rotated by any suitable source of power. Mounted loosely for rotation about the axis of the shaft is a suitable frame in which the hacksaw is mounted for reciprocation in any suitable manner. In the form shown, the frame comprises a horizontal arm 2 and a vertical arm 3 which are connected by a bent or inclined portion 4. The shaft 1 rotates in a suitable housing having a portion 5 of reduced diameter which forms a sleeve bearing for the shaft near its outer end, said portion being externally threaded to receive oppositely arranged cone bearing members 6 and the frame having cooperating conical bearing surfaces formed in the lower end of the vertical arm 3 and in an attached bearing block 7 whereby it is rotatively mounted on the cone members 6 (Fig. 8). The cone members are held between the enlarged part of the shaft housing at the end of the sleeve bearing 5 and a nut 8 on said sleeve bearing.

The hacksaw blade 9 is detachably mounted in a frame 10 in the usual manner and any suitable means are provided for mounting the frame 10 for sliding reciprocating movement on the horizontal arm 2. As shown, a longitudinally grooved slide block 11 is secured to one side of the arm 2, the upper longitudinal member of the saw frame 10 sliding back and forth in the groove and being retained therein by a cover plate 12. This reciprocation of the saw 9 and its frame 10 is accomplished by means driven by the shaft 1, preferably a suitable crank. In the form shown, the portion of the shaft immediately beyond the end of the sleeve 5 provides a seat 13 for eccentric means to be described hereinafter, and the end of the shaft is reduced in diameter and threaded at 14 to receive one end of a crank 15. A link 16 connects the other end of the crank 15 with the saw frame 10. As shown, one end of the link is forked to embrace a lug 17 on the saw frame, these parts being connected by a pivot pin 18. The other end of the link has a threaded opening to receive a stud 19 (Fig. 10), the projecting head 20 of the stud fitting rotatably in an opening in the end of the crank 15.

It will be seen that the frame 2, 3 can be swung manually or otherwise around the axis of the shaft 1, whether the shaft is rotating or not, so as to lift the saw blade 9 from the work or to lower the saw blade into engagement with the work. The rotation of the shaft causes the saw blade to reciprocate relative to the frame 2 and the work, the cutting stroke being performed as the blade is drawn toward the shaft. The saw and the frame 2, 3 also rotate around the axis of the shaft to permit the saw to sink into the work as it makes a cut.

For automatic operation, means are provided for lifting the frame 2, 3 and the saw slightly at the end of each cutting stroke, holding it so elevated during the following return stroke of the saw, and then lowering the frame and saw again to rest on the cut in the work. According to the present invention, these operations are performed by a shaft-operated lever that is rocked about its pivot in timed relation to the operation of the crank 15 so as to lift and lower the frame at the proper moments. In the form shown, a bell crank lever 21 is employed for this purpose, said lever rocking on a pivot pin 22 and having at its free end a lifting surface 23, preferably rounded, that is adapted to engage the lower end of a depending arm or support 24 secured to the frame member 2. The other arm 25 of the bell crank lever is pivoted at 26 to the end of an arm 27 of a suitable eccentric means driven by the rotating shaft so that the arm 27 is reciprocated to rock or oscillate the bell crank lever on its pivot 22. The eccentric means may be of any desired type and as here shown (Figs. 7 and 8) comprises a disk 28 eccentrically mounted on the portion 13 of the shaft 1 and secured thereto in the desired angular position by means such as set screws 29. The disk 28 is surrounded by a band formed in two parts 30 and 31 that are connected by screws 32, the part 30 being preferably made integral with the arm 27. The two parts 30 and 31 may be circumferentially grooved on their inner surfaces as shown at 33 to receive a circumferential rib 34 on the disk 28.

As the shaft 1 rotates, therefore, the crank 15 reciprocates the saw 9 and the eccentric 28 operates the arm 27 and the bell crank lever. The angular position of the eccentric 28 on the shaft is adjusted relative to the angular position of the crank 15 so that, during the return stroke of the saw, the eccentric moves the arm 27 outwardly and rocks the bell crank lever on its pivot in a direction to lift the saw blade 9 from the cut in the work. The operation is timed so that the engagement of the surface 23 with the support 24 takes place at or near the end of the cutting stroke of the saw and is maintained during the return stroke of the saw. At the end of the return stroke, the eccentric retracts the arm 27 and rocks the bell crank lever in the opposite direction to lower the saw into engagement with the cut, the bell crank lever rotating further to separate its surface 23 from the support 24 as shown in dotted lines in Fig. 1. The frame is thus released and the weight of the saw and of the frame rests on the work during the cutting stroke, the saw being free to sink into the work as it makes the cut.

It will be seen that as the saw cuts through the work and the line of cut progressively descends, the vertical position of the lower end of the support 24 at the end of each cutting stroke also progressively descends. Accordingly it is necessary to adjust the position of the bell crank lever progressively in relation to the cutting position of the saw so that the lifting surface 23 will engage the support 24 at the proper time. This adjustment is accomplished by a movable cam member arranged to provide an adjustable fulcrum for the pivot pin 22 of the bell crank lever, the cam member being progressively adjusted by the descending movement of the frame 2, 3 around the shaft. In the form shown, a stationary abutment member is constituted by a vertical end wall 35 and spaced parallel side walls 36 the edges of which provide curved abutment surfaces 37 that are preferably concentric or substantially concentric with the shaft 1 and against which the ends of the pivot pin 22 of the bell crank lever engage. A movable cam member is constituted by spaced parallel walls or plates 38 arranged to slide horizontally between the walls 36 of the abutment member (Figs. 9 and 11), the upper edges of said walls 38 providing suitably curved cam surfaces 39 which intersect the curved surfaces 37 to provide a notch-like fulcrum seat for the ends of the pivot pin 22 of the bell crank lever, the lever itself swinging between the cam plates. As the cam 38 is moved horizontally relative to the abutment 36, the apex of the notch formed by the intersecting surfaces 37, 39 moves both vertically and horizontally and the pivot of the bell crank lever is adjusted accordingly.

The automatic adjustment of the movable cam member 38 is preferably accomplished by an arm 40 secured to the vertical frame member 3 in any suitable manner as by means of screws 41 and having its lower end 42 loosely engaging in a slot 43 formed in a longitudinally movable bar 44 attached to the cam plates 38. A stud 45 in the bar 44 provides an abutment for one end of a spring 46 the other end of which engages a pin 47 on the lower end of the arm 40 so that the slide bar 44 and cam plates 38 are urged toward the stationary abutment and the end 42 of the arm 40 is normally maintained in engagement with the end of the slot 43.

As the frame 2, 3 rotates around the shaft 1 during the cutting stroke of the saw, therefore, the arm 40 moves the slide bar 44 and cam plates 38 outwardly by a distance corresponding to the amount that the saw sinks into the work. The cam surfaces 39 are of course designed so that this movement of the cam member causes a displacement of the pivot pin 22 of the bell crank lever such as to adjust the position of the lifting surface 23 thereof by an amount corresponding to the depending movement of the lower end of the support 24. Accordingly the bell crank lever always engages the support 24 at substantially the same instant in relation to the completion of the cutting stroke of the saw, lifts the saw by substantially the same amount during its return stroke, and lowers the saw into engagement with the work and releases the frame at the beginning of the cutting stroke.

During such lifting of the frame and saw, the end 42 of the arm 40 is moved slightly in the opposite direction, and the slot 43 is long enough to permit this reverse movement of the end 42 without positively actuating the slide bar 44 in the opposite direction. Because of the spring 46, however, and also to insure against accidental displacement of the cam member, it is desirable to provide means holding the cam member against longitudinal movement except during the cutting stroke of the saw. Preferably this locking of the cam member is accomplished in response to the weight of the saw and frame on the bell crank lever when engaged and lifted thereby. In the form shown, the outer end of the bar 44 slides in a U-shaped guide 48 mounted on the machine by screws 49, a close fit being maintained by the use of a gib 50. The end of the bar 44 is slidably supported underneath the guide 48 by a suitable fulcrum means preferably in the form of a small plate 51. This plate is long enough to provide adequate support for the remaining length of the bar 44 and cam plates 38 and the bell crank lever so that the bar 44 can slide outwardly through the guide during the cutting stroke of the saw without tending to tilt or bind in the guide. When the weight of the saw and frame is picked up by the bell crank lever and is supported during the return stroke of the saw, however, this additional weight on the unsupported end of the bar 44 causes the bar to bind in the guide 48 so that a cramp lock is provided which holds the cam member in its adjusted position against the force of the spring 46 and against accidental displacement.

It will therefore be seen that the gradual and progressive descent of the saw and frame as the saw cuts its way through the work is accompanied by progressive outward movement of the cam member as illustrated by the successive positions of the parts shown in Figs. 1, 2 and 3. The pivot pin 22 of the bell crank lever accordingly sinks gradually between the cooperating surfaces 37 and 39, the fulcrum of the lever being thus maintained in a position corresponding to the position of the saw in the work in such a way that the frame is engaged and lifted by the bell crank lever at the proper point. As shown in Fig. 3, when the surface 23, the axis of the pivot pin 22, and the axis of the shaft 1 are in alignment, then the lower end of the support 24, the surface 23 and the end 42 of the lever 40 should preferably be concentric about the axis of the shaft 1.

It will be seen that the invention provides a simple sturdy apparatus which is fast and efficient in its operation with a minimum of moving parts and without ratchets, gears, clutches and like delicate parts which might get out of adjustment or wear excessively with long continued use. The apparatus is inexpensive and can be built out of stock material such as bar and flat or angle steel stock. The saw is lifted easily from the cut at the end of the cutting stroke and lowered into engagement with the cut at the end of the return stroke gradually and without shock by the eccentric-controlled movement of the bell crank lever.

While only one embodiment of the invention has been illustrated in the drawings and described above, it will be understood by those skilled in the art that the invention is not restricted to this embodiment and that various changes may be made in the form, details of construction and arrangement of the parts without departing from its spirit. Reference should therefore be had to the appended claims for a definition of the limits of the invention.

What is claimed is:

1. A hacksaw lift apparatus comprising a pivoted frame adapted to carry a reciprocating hacksaw, a pivoted bell crank for changing approximately horizontal to vertical motion, said bell crank being movable into lifting engagement with said frame for lifting it relative to the work at the end of the cutting stroke and movable out of engagement with said frame at the end of the return stroke of the saw, a rotatable eccentric and a member moved thereby in an approximately horizontal direction, said member being connected to and moving said bell crank into and out of engagement with said frame as aforesaid, a cam member and a stationary abutment together providing an adjustable fulcrum for said lever, said cam member being movable in a direction to decrease the lifting height of said bell crank as the saw sinks into the work, a member movable with said frame and connected to said cam for moving the latter by an amount corresponding to the descent of the frame relative to the work, and means for locking said cam against movement when said frame is lifted by said bell crank.

2. A hacksaw lift apparatus as defined in claim 1, said locking means comprising an arm extending laterally from and supporting said cam member, a guide surrounding said arm and through which said arm is normally slidable, and a fulcrum plate slidably supporting said arm adjacent said guide, the weight of said lifted frame on said cam member and arm canting said arm over said fulcrum plate and in said guide and thereby binding said arm and cam against movement relative thereto.

3. A hacksaw lift apparatus as defined in claim 1, said stationary abutment having a surface intersecting and cooperating with the surface of said movable cam member to form a substantially V-shaped notch opening upwardly, said bell crank having a pivot resting freely in the apex of said notch and said cam member moving relative to said abutment to lower the apex of said notch as said frame descends relative to the work.

4. A hacksaw lift apparatus comprising a pivoted frame adapted to carry a reciprocating hacksaw, a pivoted bell crank movable into lifting engagement with said frame for lifting it relative to the work at the end of the cutting stroke and movable out of engagement with said frame at the end of the return stroke of the saw, a rotatable shaft eccentric and a member driven thereby and connected to and moving said bell crank into and out of engagement with said frame as aforesaid, adjustable fulcrum means for said bell crank comprising a stationary abutment and a relatively movable cam plate having cam edges which intersect to form a substantially V-shaped notch opening upwardly, said bell crank having a pivot resting freely in said notch, an arm rigid with said frame and connected to said cam plate for moving it in a direction to decrease the lifting height of said bell crank as the saw sinks into the work, said arm moving said cam plate in said direction during each cutting stroke by an increment corresponding to the descent of the frame relative to the work, means for locking said cam plate against movement in the opposite direction during return strokes comprising an arm extending laterally from and supporting said cam plate, a guide in which said supporting arm has a close sliding fit, and a fulcrum plate slidably supporting said supporting arm, the weight of said lifted frame on said bell crank and said cam plate canting said supporting arm over said fulcrum plate and in said guide and thereby binding said supporting arm and said cam plate against movement relative thereto, and a spring interposed between said rigid arm and said cam plate which is compressible when said rigid arm moves relative to said cam plate during said return strokes.

WALTER L. HATCH.

REFERENCES CITED

The following references are of record in the file of this patent:

UNITED STATES PATENTS

| Number | Name | Date |
| --- | --- | --- |
| 1,264,202 | Miller | Apr. 30, 1918 |
| 1,269,883 | Wardman | June 18, 1918 |
| 1,999,387 | Aspey | Apr. 30, 1935 |

FOREIGN PATENTS

| Number | Country | Date |
| --- | --- | --- |
| 311,976 | Germany | May 18, 1919 |
| 321,713 | Germany | June 12, 1920 |
| 329,624 | Germany | Nov. 26, 1920 |